W. E. ANDREW.
SPRING STRUCTURE.
APPLICATION FILED MAR. 15, 1917.
1,325,604.
Patented Dec. 23, 1919.
5 SHEETS—SHEET 1.
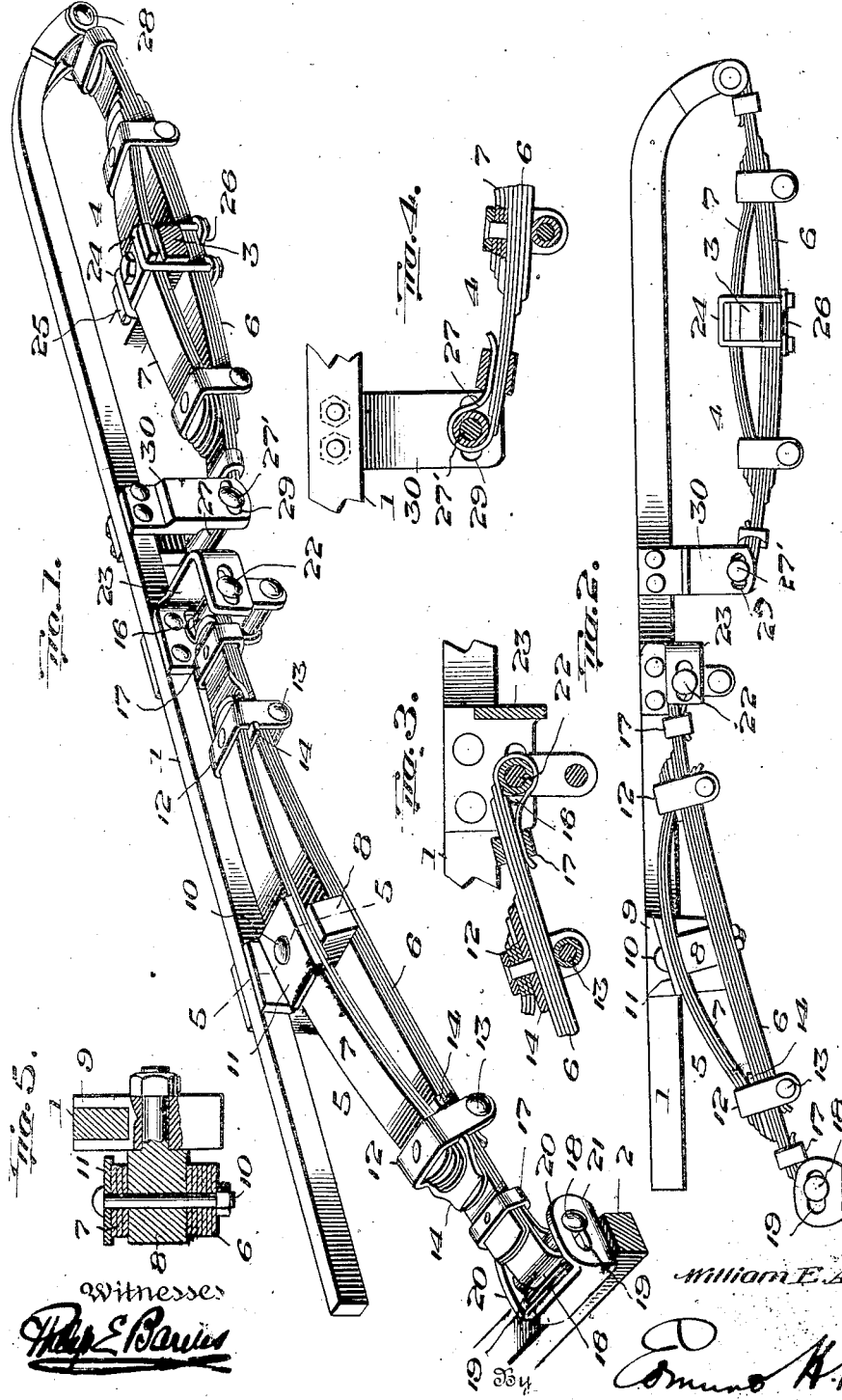
Witnesses
Inventor
William E. Andrew
By
Attorney

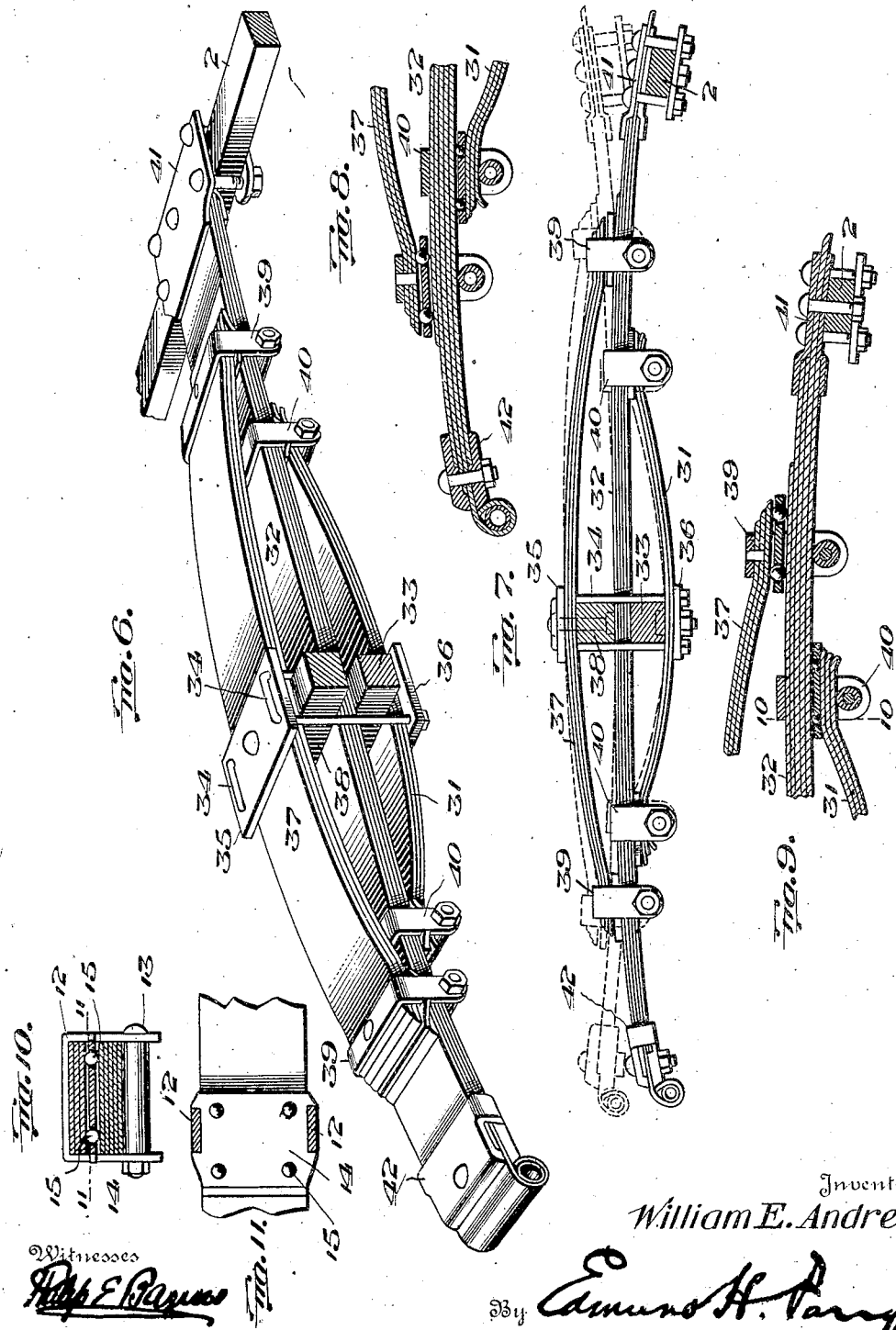

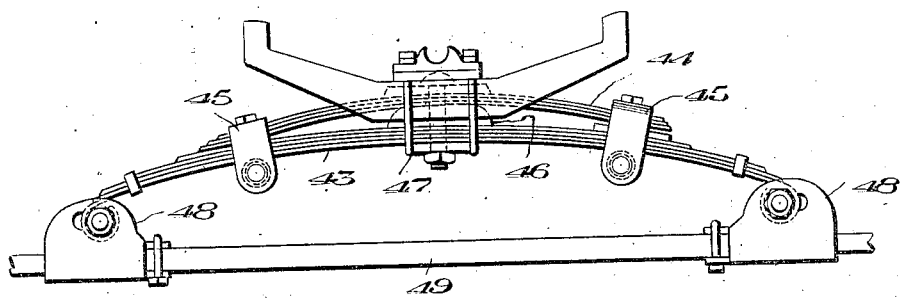
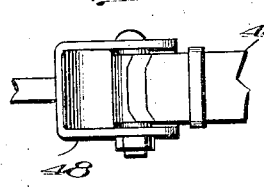
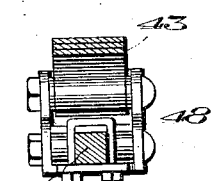
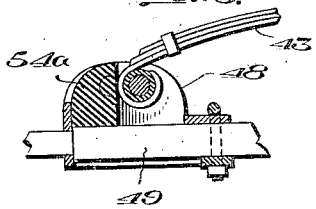
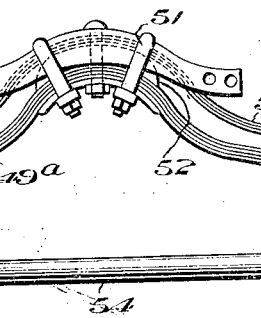
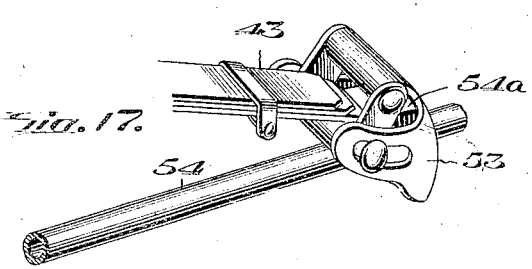
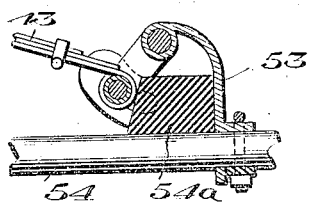

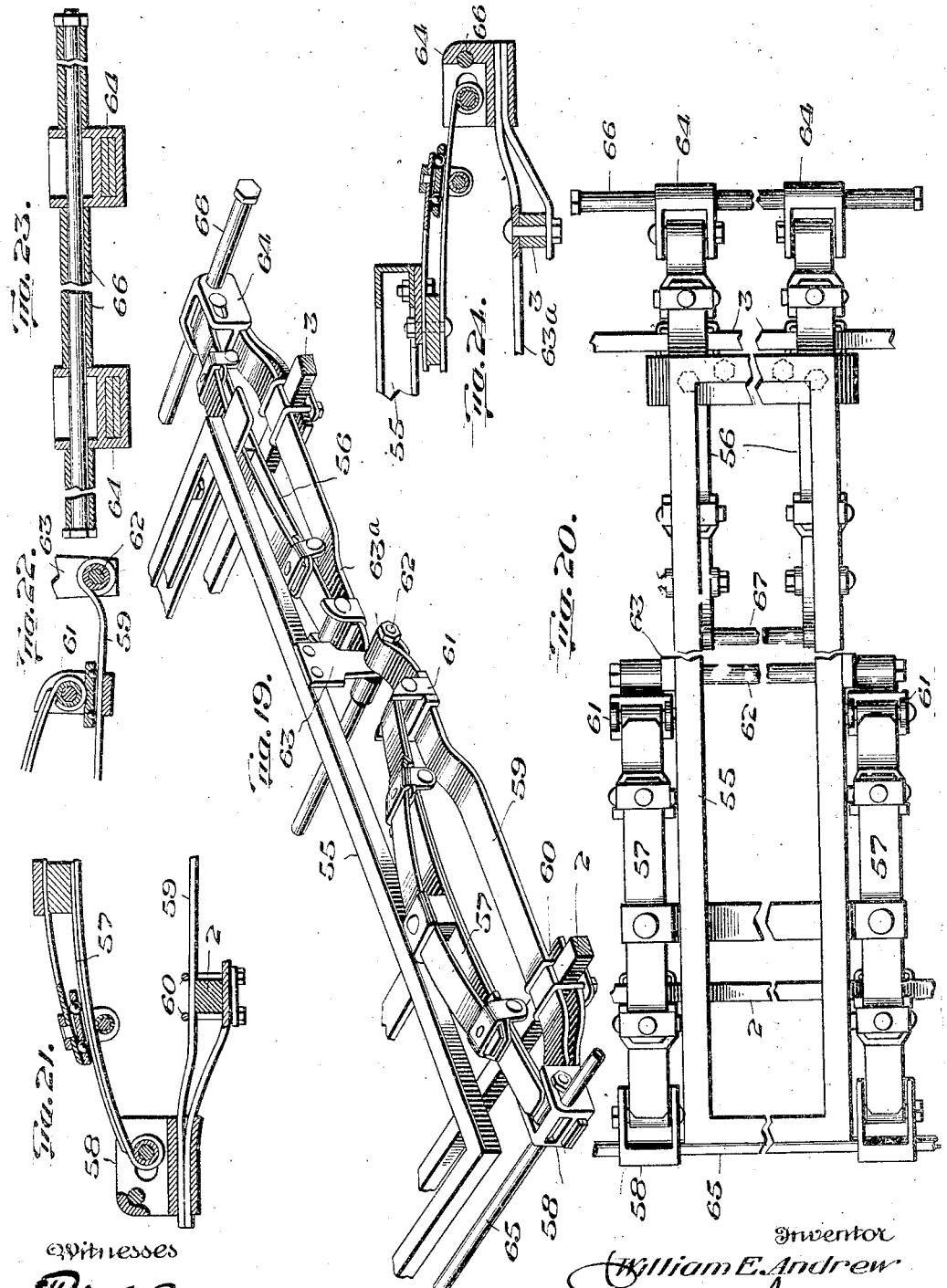

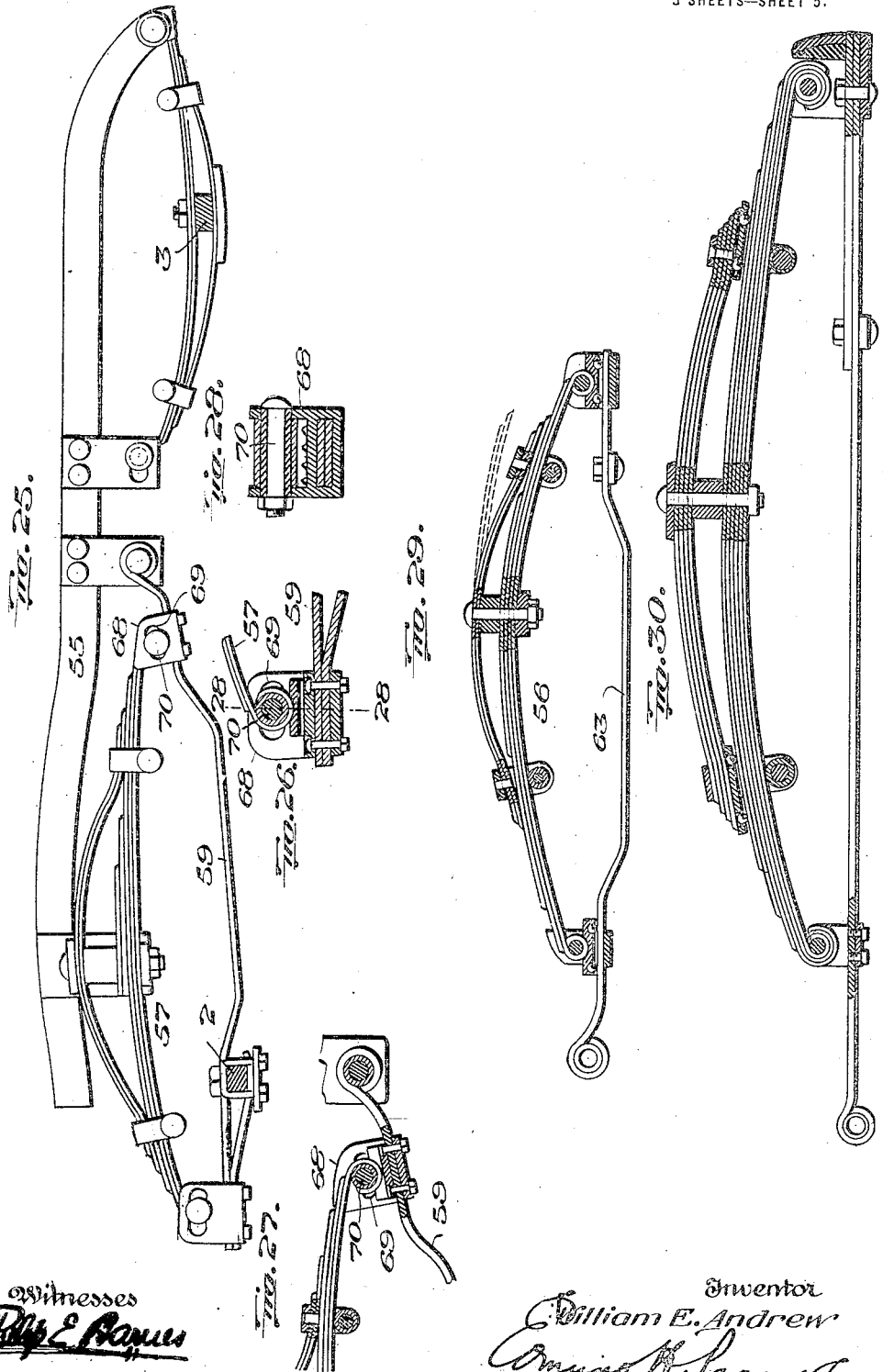

UNITED STATES PATENT OFFICE.

WILLIAM E. ANDREW, OF ATLANTIC HIGHLANDS, NEW JERSEY.

SPRING STRUCTURE.

1,325,604. Specification of Letters Patent. Patented Dec. 23, 1919.

Application filed March 15, 1917. Serial No. 155,029.

*To all whom it may concern:*

Be it known that I, WILLIAM E. ANDREW, a citizen of the United States, residing at Atlantic Highlands, in the county of Monmouth and State of New Jersey, have invented certain new and useful Improvements in Spring Structures, of which the following is a specification, reference being had therein to the accompanying drawing.

This invention relates broadly to spring structures, such as those commonly employed in vehicles and the like; and has more especial reference to spring-structures that have the capacity of absorbing shocks and preventing rebound of the vehicle-body to which the spring-structure is attached.

A primary object of the invention is to provide an improved spring-structure particularly adapted for use in automobiles and adapted to control any sudden upward movement of the vehicle-body (after the same has flexed the structure) and thereby reduce liability of shocks, jars and the like to a minimum.

A further object within the contemplation of my invention is to provide a spring-structure in such form that it shall essentially include a primary spring-member of appropriate length, a secondary spring-member of relatively less length and having its ends adjustably attached to the primary member, and a spacing instrumentality interposed between the primary and secondary members and adapted to effect a bowing of the secondary member and, consequently, a normally flexed condition greater than that of the primary member, whereby it has a normal tendency to effect a pulling action at its ends, and a pushing action intermediate of its ends.

A further object of the invention is to provide, in conjunction with the aforementioned spring-structure, a bearing-support in respect to which the spring-structure has relative movement both longitudinally as well as transversely.

The invention in general seeks to provide a spring - structure which is particularly adapted for use in vehicles that are used on roads of more or less uneven surface and which structure from an operative standpoint has in practical use been found to possess a high degree of efficiency and durability and which, due to its structural simplicity, may in some forms be readily applied to existing structures without material modification.

Other objects and advantages of the invention, inherent in the structure itself, will be obvious from, or will be pointed out in, the following description.

The invention resides broadly in the features of construction and in the aggroupment of the elements so related to each other as to function in a novel manner, all as exemplified in the description hereinafter set forth and the scope of application which is indicated in the claims hereto appended.

In order that the invention may be more readily comprehended, drawings illustrating some of the many possible utilizations and embodiments of the same are appended hereto as a part of this disclosure, it being understood that the same are merely illustrative and that the disclosed structures are capable of considerable modification for other possible utilizations and embodiments without departing from the principles and spirit of the invention.

In these drawings:

Figure 1 is a fragmentary view, in perspective, of a structure made in accordance with one embodiment of the invention and which, in this instance, is shown as including two spring-structures attached to a portion of the chassis frame an axle of the present cantaliver system in relatively different ways;

Fig. 2 is also a fragmentary view, in side elevation, of the same;

Fig. 3 is a fragmentary view in vertical longitudinal section of a portion of the right-hand portion of the larger spring-portion shown in Figs. 1 and 2;

Fig. 4 is a similar view of the left-hand portion of the smaller of the two spring-structures shown in Figs. 1 and 2;

Fig. 5 is a view in vertical transverse section on the line 5—5, Fig. 1;

Fig. 6 is a view similar to Fig. 1 of a modified form of spring-structure;

Fig. 7 is a view in side elevation thereof, showing the same, in full lines, in its normal position and condition and, in dotted lines, in its flexed position and condition;

Fig. 8 is a fragmentary view in vertical longitudinal section of the left-hand portion of the spring-structure of Figs. 6 and 7;

Fig. 9 is a similar view of the right-hand portion of the structure of Figs. 6 and 7;

Fig. 10 is a view in vertical transverse section on the line 10—10, Fig. 9;

Fig. 11 is a fragmentary view in horizontal section of the line 11—11, Fig. 10;

Fig. 12 is a view in front elevation of an embodiment of my invention as designed particularly for application to the front end of so-called "Ford" cars;

Fig. 13 is a similar view of the type of spring-structure which I devised particularly for application to the rear of so-called "Ford" cars;

Fig. 14 is a fragmentary view in top plan of one of the ends of the spring-structure of Fig. 12;

Fig. 15 is a view in vertical longitudinal section of the portion shown in Fig. 14;

Fig. 16 is a view in vertical transverse section of the same;

Fig. 17 is a fragmentary view in perspective of the right-hand portion of the spring-structure of Fig. 13;

Fig. 18 is a fragmentary view in vertical longitudinal section of the same;

Fig. 19 is a view in perspective of the spring-structure as applied to the so-called "cantaliver" system;

Fig. 20 is a fragmentary view in plan of a somewhat modified form of construction;

Fig. 21 is a fragmentary view in vertical longitudinal section of the left-hand portion of the spring at the left of Fig. 19;

Fig. 22 is a similar view of the right-hand portion thereof;

Fig. 23 is a view in vertical transverse section through the holding member at the extreme right hand portion of Fig. 24;

Fig. 24 is a fragmentary view in vertical longitudinal section of the right-hand portion of the spring at the right in Fig. 19;

Fig. 25 is a fragmentary view in side front elevation of the structure shown in Fig. 20;

Fig. 26 is a fragmentary view in vertical longitudinal section of the left-hand portion of the larger spring shown in Fig. 25;

Fig. 27 is a similar view of the right-hand portion of the same;

Fig. 28 is a view in vertical transverse section on the line 28—28, Fig. 26;

Fig. 29 is a view in vertical longitudinal section of another modification; and

Fig. 30 is a similar view of still another modification.

The different views illustrated in these drawings may, for purposes of convenience, be divided into groups; those embraced in Figs. 1 to 11 being what I shall herein term "structures of general application"; those embraced in Figs. 12 to 18 being what I shall herein term "Ford car structures"; and those embraced in Figs. 19 to 30 being what I shall herein term "cantaliver system." It will be understood that these various groups are characterized by an underlying feature which is common to the various groups; therefore, in the following description, it will be understood that this feature is characteristic of all of the types of modifications.

*Structures of general application.*—In the various figures constituting this group, the reference-character 1 designates, generally, a supporting part of the body of the vehicle-chassis to which portions of my improved spring-structure are adapted to be attached; and 2 and 3 designate, generally, the axles of the vehicle.

As shown in Figs. 1 and 2, two forms of springs, embodying the characteristic principles of my invention, are shown as mounted upon the chassis 1 and, for purposes of identification, I shall herein designate them the front spring 4 and the rear spring 5. Both of these springs comprise a primary spring-device 6 and a secondary spring-device 7, the latter being of relatively less length than the former and connected at its ends to the spring-device 6 in a manner more specifically hereinafter detailed.

Interposed between and, by preference, rigidly connected to, the spring-devices 6 and 7 is a spacing member 8, preferably of greater dimensions than the thickness of either of the spring-devices 6 and 7 and having the function, among others, to maintain the central portions of the springs in spaced-apart relation and, at the same time, to effect—in coöperation with other instrumentalities presently to be described—a bowing of the spring 7 in respect to the spring 6 whereby the former is normally in a flexed condition and adapted thereby to effect a normal upward pull at its ends upon the spring 6 and a normal downward pushing action at the central portion of the spring 6. The spacing member 8 is preferably formed as an extension of a bracket 9 rigidly secured to the support 1, the spacing member 8 having some rotative movement in the bracket 9. The spacing member 8 is connected to the springs 6 and 7 by a bolt 10 which engages a top-plate 11 mounted on the spring 7.

Preferably, each of the springs 6 and 7 comprises a plurality of leaf-elements, and at the point of connection of the springs 6 and 7 to the spacing member 8, the leaves are for all intents and purposes rigid one with the other.

As already mentioned, the spring 7 is shorter in length than the spring 6 and has its ends adjustably connected to the spring 6 at a point intermediate of its ends and the spacing member 8; this adjustable connection, in this instance, comprising an inverted U-shaped element 12 preferably riveted to the top leaf of the spring 7 and having its lower free ends connected by a bolt 13 which underlies the lowermost spring leaf of the spring 6. Interposed between the ends of the spring 7 and the uppermost leaf of the spring 6 is a friction-plate 14 which is engaged by the element 12 at its side and is provided with holes to receive balls 15 for other anti-friction instrumentalities. The U-shaped elements 12, coöperating with the spacing member 8, maintain the spring 7 in the bowed condition already mentioned; it being understood that, before the ends of the spring 7 are drawn down and clipped to the spring 6, their tendency is to stand away from the spring 6; but, when these ends are pressed down toward and clipped to the spring 6, the spring 7 is caused to bow upwardly so that, when they are connected together in the manner described, the ends will have a normal tendency to effect an upward pulling action on the spring 6 at its ends, whereas there will be a corresponding downward pushing action caused thereby on the spring 6 adjacent its connection to the spacing member 8.

One of the leaves of the spring 6 is, as shown in Fig. 3, bent to form an eye 16, this bent end, and the other leaves of the spring being connected by a clip 17. Extending through the eye 16 at the left-hand end of the spring-device 5 is a bolt 18 adapted to have a sliding movement in elongated slots 19 in the upturned portions 20 of an attaching member 21 adapted to be secured to the axle 2. The opposite end of the spring-device 5 is, by a bolt 22, slidably mounted in a bracket 23 secured to the support 1, as shown.

The spring-device 4 is, in general principles, the same as the spring-device 5; but in this instance the springs 6 and 7 are maintained in spaced relation by the axle 3, which, so far as the function of spacing is concerned, operates similarly to the member 8. The spring-devices are connected to the axle 3, in this instance, by clips 24 which engage a top plate 25 and carry a bottom plate 26, as shown. Through the eyes 27 of the springs 6 of the spring-device 4 extend bolts 27' and 28, the bolt 27' having a sliding movement in the elongated slots 29 formed in pendent brackets 30. The bolt 28 connects the forward end of the spring-device 4 to the end of the support 1, as shown.

In Figs. 6 to 11, there is illustrated a modification, this consisting principally in its inclusion of a third spring 31 spaced from the spring 32 by a spacing member 33 and rigidly connected, centrally, to the spring 32 by clips 34 which extend through a top plate 35 and a bottom plate 36. A spring 37, corresponding to the spring 7 in Figs. 1 to 5, is connected to the spring 32 in substantially the same manner as the spring 7 is connected to the spring 6 and maintained in spaced relation from the spring 32 by a spacing member 38. The ends of the spring 37 are slidably clipped to the spring 32 by the members 39, corresponding to the U-shaped members 12. The spring 31 is clipped to the spring 32 by the members 40 in the same manner as described with respect to the connection between the ends of the spring 7 and the spring 6. In this instance, the spring 32, like the spring 6, normally carries the load and is flexed thereby; but, when such load is excessive, or if the movement of the vehicle body effects action of the spring 32 beyond a predetermined point, the spring 31 functions to assume part of the load and supplements the action of the spring 32. On the other hand, the spring 37 effects a governing action on the springs 32 and 31 similarly as does the spring 7 in respect to the spring 6. In this instance, the spring 32 is, at its rear end, attached to the axle 2 by a clip device 41, which, as shown, embraces the ends of the leaves of the spring and not only connects them to the axle but also holds them rigidly together. The forward end of the spring 32 may be connected to a bracket (not shown) carried by the support 1, and of any suitable character. In this instance, the ends of the spring 32 are secured together by a clip 42, as shown in Fig. 8.

*Ford car structures.*—In the group of views embraced in Figs. 12 to 18, I have shown an embodiment particularly designed and adapted for application to so-called "Ford" cars. In this instance, and referring to Figs. 12 to 15, it will be seen that the spring 43 corresponds in general construction to the spring 6, already described, while the governing spring 44 corresponds to the spring 7. The ends of the spring 44 are adjustably connected to the spring 43 by the clip devices 45, corresponding to the members 12; while the springs 43 and 44 are maintained in spaced relation by a saddle member 46; the springs and saddle member being secured together by a clip device 47. The ends of the spring 43 are slidably mounted in brackets 48 carried by a front axle 49.

Referring to Figs. 13 to 18, a spring 49ª is connected, in spaced relation, to a governing spring 50 by a clip device 51 which extends around a spacer 52. The opposite ends of the spring 49ª are slidably mounted in brackets 53 carried by the axle 54.

The brackets 48 and 53 are employed in lieu of the usual shackle devices used in Ford cars, and permit of proper action of my construction.

Carried by the brackets 48 and adapted to be engaged by the ends of the spring 43 are resilient bumpers 54ª Figs. 15 and 18.

*Cantaliver system.*—In the views embraced in Figs. 19 to 24, I have disclosed my improved spring structure as employed in what I shall herein designate, a "cantaliver system"; this system, however, contemplating an action different from the usual so-called "cantaliver" idea, in that, by reason of a different manner of connecting the spring structures in the system, they operate to carry the load and control movement of the vehicle body without effecting any pushing action of that body on and in relation to the spring structures, as occurs in the usual "cantaliver" structures with which I am familiar. The difference in action in my "cantaliver" system is primarily due to the fact that I include supports for the spring structures such that the two sets thereof co-act one with the other and obviate the employment of the usual torsion rods, now found to be necessary in present-day constructions to prevent or overcome the aforementioned pushing action. Referring, now, to Fig. 19, it will be observed that the chassis support, in this instance, comprises a frame 55, in juxtaposition to which are arranged the front axle 3 and the rear axle 2. In this example, there is a front spring-device 56 corresponding to the spring-device 4, shown in Fig. 1 and a rear spring-device 57 corresponding to the spring-device 5 in Fig. 1. So far as the construction of these spring-devices 56 and 57 and the manner of attaching the spring-device 57 to the chassis body are concerned, what has been set forth in describing the spring structures 4 and 5 of Fig. 1 will suffice to make clear how the spring-devices of Fig. 19 are constituted. Instead, however, of connecting the spring-device 57 to the axle 2, as in Fig. 1, its rear end is mounted in a bearing 58 corresponding to the member 21 in Fig. 1; and also connected to and extending from this bearing member 58 is a bearing instrumentality 59, this being, in the present instance, rigid and secured to the axle 2, as by the clip device 60. This instrumentality 59 constitutes not only a support for the bearing member 58 but also serves as a support for a front bearing member 61 to which the forward end of the spring-device 57 is connected. The bearing member 61 is slidably mounted on the instrumentality 59 whereby it will adjust itself thereon when the spring-device 57 is flexed by the load. The forward end of the instrumentality 59 is preferably connected to a cross rod 62 journaled in a bracket 63 depending from the support 55. In this instance, the cross rod 62 also serves as a support for the rear end of a rigid bearing instrumentality 63ᵃ upon which the spring-device 56 is supported, the latter being connected to the support 55 and terminating in a bearing member 64 corresponding to the bearing member 58, and in which also terminates the forward end of the bearing instrumentality 63ᵃ. The bearing members 58 at opposite sides of the vehicle are connected by a rod 65; and the bearing members 64 are similarly connected by a rod 66. By this arrangement and construction, including the bearing members 59 and 63ᵃ and the connecting rods 62, 65 and 66, a construction is presented which maintains a condition of rigidity that insures better action of the spring-structures to carry the load of the vehicle-body and also to effect a governing of the flexing movement of the spring-devices through the governing springs forming a part thereof. By these means, rebound of the vehicle-body is reduced to a minimum, if not entirely eliminated, so that the car rides smoothly and easily.

In lieu of connecting the bearing members 59 and 63ᵃ to a single cross-rod, like 62, I may provide a second cross-rod 67, to which the rear end of the bearing instrumentality 63 is attached, the forward ends of the bearing instrumentalities, only, being connected to the cross-rods 62. This provides for any desirable independent action of the two spring-structures, and this is, perhaps, essential in particularly long cars.

In Figs. 25 to 30, the general construction disclosed in Figs. 20 to 24 is shown but in a different manner of application to the chassis body. Moreover, in Figs. 25, 26 and 27, the bearing member has rigidly secured to it brackets 68 provided with elongated slots 69 in which slides a cross-pin 70 carried by one end of the spring-structure. This provides for an adjustment of both ends of the spring in respect to the bearing member.

From the foregoing, it will be perceived that I have succeeded in devising a spring-structure which is well adapted to achieve the various objects and ends in view; and that I have thereby presented a construction which is essentially important in eliminating, in automobiles, the undesirable rebound and jars incident to uneven roads, etc.

What I claim is:

1. A spring-structure including a plurality of spring elements joined at a point intermediate their ends, one of the elements being connected at its ends to the other element and spaced therefrom intermediate its ends and having a normal tendency to effect a pulling action on the other element at their points of connection and a pushing action in the opposite direction at said juncture.

2. A spring-structure including a plurality of flat springs disposed in superposed relation, means for connecting two of the springs together intermediate their ends in spaced-apart relation, and means for connecting the ends of the uppermost element to the underlying element for a contacting, sliding action and in such manner that the uppermost element has a normal tendency to effect a downward pushing action on the underlying element intermediate its connected ends and a normal tendency to effect an upward pulling action on the underlying element at the points of sliding connection therebetween.

3. A spring-structure including two juxtaposed flat spring devices one overlying the other and spaced-apart therefrom intermediate its ends and normally under tension, and means for connecting the ends of the tensioned spring device to the other device, in combination with a bearing-instrumentality, and means for connecting one end of the lower spring device to the bearing-instrumentality, the other end of the lower spring device being slidably mounted on said bearing-instrumentality.

4. A spring-structure including two spaced-apart spring devices, one overlying the other and normally under tension, the ends of the tensioned spring device being slidably connected to the underlying spring device, in combination with a bearing-instrumentality, a connection between one end of the underlying spring device and the bearing-instrumentality, and means for slidably connecting the other end of the underlying spring device thereto.

5. In combination, a vehicle chassis, an axle, a bearing-instrumentality connected to the axle and to the chassis, a spring-structure mounted at one end on said bearing-instrumentality, means for slidably connecting the other end of said spring-structure to the bearing-instrumentality, said spring-structure including two spring members one overlying the other and one of which is normally under tension, and means for connecting the ends of the tensioned member to the other spring member.

6. A spring structure of the cantaliver type comprising a primary load-carrying spring; a spacing-member disposed on said spring; and a secondary spring mounted on said spacing-member and secured, in proximity to its ends, to said primary spring and normally exerting a pulling action against said primary spring; said secondary spring having a bearing on said primary spring and acting as an auxiliary carrying-spring upon application of a load.

7. A spring structure comprising in combination with a supporting-frame and brackets thereon; a spring-support pivotally secured at one end to one of said brackets; bearing members mounted on said spring-support; a primary load-carrying spring mounted at one end on one of said bearing-members and slidably mounted, at its opposite end, in another of the members mounted on said spring-support; a spacing-member mounted on said primary load-carrying spring; an auxiliary spring mounted on said spacing-member and in spaced relation to the primary spring intermediate its ends; the ends of said auxiliary spring being connected with the primary load-carrying spring and having a bearing thereon, and normally pulling against said primary spring and acting as an auxiliary load-carrying spring upon application of a load; a second spring support mounted at one end on one of said brackets; a bearing mounted on said support; and a spring structure slidably mounted on said support, whereby pressure exerted on said spring members is transmitted laterally along said spring-supports.

8. A spring structure comprising a primary load-carrying spring; a spacing-member mounted thereon; a secondary spring connected with said spacing-member and said primary spring and normally exerting a pulling force against the primary spring, said secondary spring acting as an auxiliary carrying-spring upon application of a predetermined load, and acting upon a rebound of said primary spring as a shock absorbing instrumentality.

9. A spring structure comprising in combination with a supporting-frame and brackets thereon; a spring-support pivotally secured at one end to one of said brackets; a bearing member mounted on said spring-support; a primary-load-carrying spring mounted at one end on said bearing-member and slidably mounted, at its opposite end, in a member mounted on said spring-support; a spacing-member mounted on said primary load-carrying spring; an auxiliary spring mounted on said spacing-member and in spaced relation thereto, intermediate its ends; the ends of said auxiliary spring being connected with the primary load carrying spring and having a bearing thereon, and normally pulling against said primary spring and acting as an auxiliary load-carrying spring upon application of a load; a second spring-support mounted at one end on one of said brackets; a bearing mounted on said support; a spring structure slidably mounted on said support, whereby pressure exerted on said spring members is transmitted laterally along said spring-supports, and axles mounted on said spring-supports.

10. A spring structure comprising in combination with a vehicle frame and brackets thereon; a spacing-member rotatably mounted in one of said brackets; a carrying-spring secured to one side of said spacing-member; an auxiliary spring secured on the opposite side of said spacing-member, intermediate its ends, and connected, in proximity to its ends, with the primary carrying spring; said auxiliary spring having a bearing on said primary spring and normally pulling against it, but acting as an auxiliary carrying spring upon application of a load; a rigid support mounted on one of the brackets; said support having thereon bearing members; said carrying spring being secured at its opposite ends to said bearing members; a second spring secured to said supporting-frame and connected at one end to said first-mentioned spring; and a plurality of bracing members associated with said springs.

11. A spring structure comprising in combination with a vehicle frame and brackets thereon; a cross-brace mounted on one of the brackets; a spring-support pivotally secured at one end of said cross-brace; a bearing member mounted on said spring-support; a primary load-carrying spring mounted, at one end, on said bearing-member and slidably mounted, at its opposite end, in a member mounted on said spring-support; a spacing-member mounted on said primary load-carrying spring; an auxiliary spring mounted on said spacing-member and in spaced relation thereto, intermediate its ends; the ends of said auxiliary spring being connected with the primary load-carrying spring and having a bearing thereon, and normally pulling against said primary spring and acting as an auxiliary load-carrying spring upon application of a load; a second support secured, at one end, to one end of said cross-brace; a bearing mounted thereon; and a spring structure secured at one end to said bearing and slidably mounted, at its opposite end in a bearing mounted on said support, whereby pressure exerted on said spring members is transmitted laterally to said bearing and away from said supports, said auxiliary springs acting as shock absorbing instrumentalities when force is applied thereto in the opposite direction.

12. A spring structure comprising in combination with a vehicle frame and brackets thereon; a spring-supporting member mounted, at one end, on one of said brackets; an axle mounted on said supporting member; a brace member secured to said axle and said supporting member; a spring bearing member mounted at one end on said supporting member; a spring bearing member at the opposite end of said supporting member; a primary load-carrying spring mounted for slidable movement in said bearing members; a second support mounted on one of said brackets; an axle disposed on said support; and a load-carrying spring mounted for slidable movement in bearings on said support, whereby force applied to said load-carrying springs, is transmitted laterally independently of said supporting member.

13. A spring structure comprising in combination with a vehicle frame and brackets thereon; a spring supporting member mounted, at one end, on one of said brackets; an axle mounted on said supporting member; a brace member secured to said axle and said supporting member; a spring bearing member mounted at one end of said supporting member, a spring bearing member at the opposite end of said supporting member; a primary load-carrying spring slidably mounted in one of said bearing members for slidable movement in said bearing member; a second support mounted on one of said brackets; an axle disposed on said support; a load-carrying spring mounted for slidable movement in bearings on said support, whereby force applied to said load-carrying springs is transmitted laterally independent of said supporting member; and bumping members associated with said bearing members.

In testimony whereof I affix my signature in presence of two witnesses.

WILLIAM E. ANDREW.

Witnesses:
A. LISSOURTZ,
JAMES ATKINS.